Sept. 27, 1966        G. B. JACOBY        3,274,904
VENTED BRAKE WHEEL CYLINDER ASSEMBLY
Filed Oct. 30, 1964
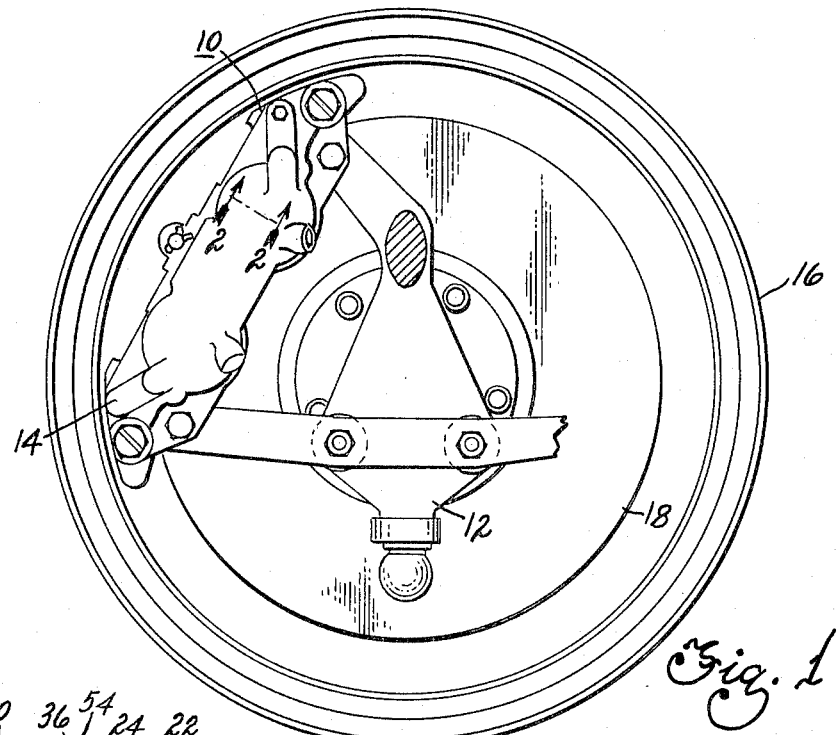
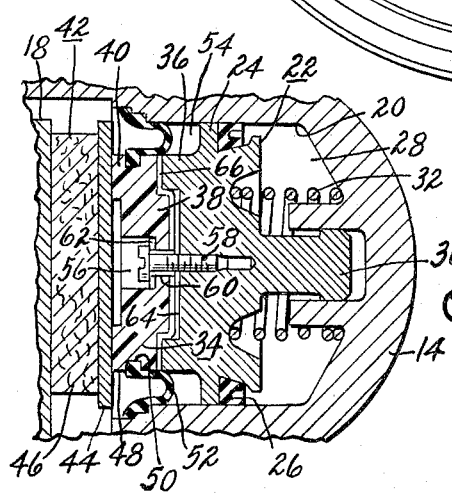
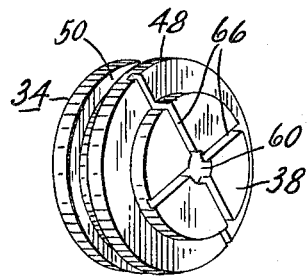
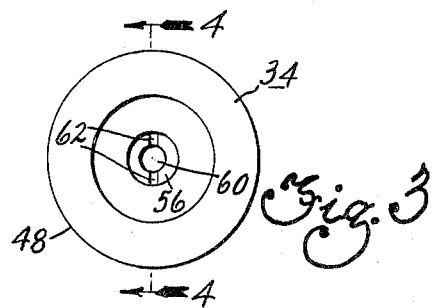
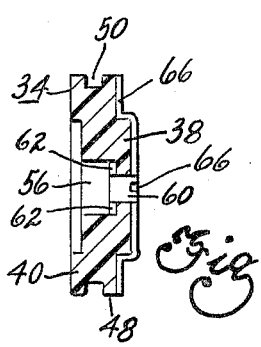
INVENTOR.
GERALD B. JACOBY
BY *D.D. McGraw*
HIS ATTORNEY

3,274,904
VENTED BRAKE WHEEL CYLINDER ASSEMBLY
Gerald B. Jacoby, Dayton, Ohio, assignor to General Motors Corporation, Detroit, Mich., a corporation of Delaware
Filed Oct. 30, 1964, Ser. No. 407,723
3 Claims. (Cl. 92—99)

The invention relates to a wheel cylinder assembly with provision for venting an otherwise sealed chamber to prevent pressure build-up and consequent seal damage. It more particularly relates to a wheel cylinder assembly of the type utilized in actuating disc brakes, since such wheel cylinder assemblies are subject to greater heating and cooling variations which affect air trapped behind the dust seal or boot of the assembly.

In the usual piston type direct brake actuation mechanism for disc brakes, a hydraulic pressure actuated piston is moved in a cylinder bore to engage a friction pad with a rotating disc for braking action. The piston is located close to the friction pad and is, therefore, subject to heat generated during the braking action. The outer end of the bore in which the piston is movable is usually sealed to prevent the entry of dust and other foreign matter. It is often desirable to use a seal which is secured at its inner periphery to the piston and at its outer periphery to the housing in which the cylinder bore is formed. Since the piston must move in the bore, the seal must be flexible and of such length as to permit this movement. A chamber is, therefore, provided behind the seal and formed by the piston and the cylinder bore to contain the seal. The volume of this chamber varies with piston movement resulting from brake wear or disc deflections. This chamber is normally filled with air and is subject to being heated and cooled during the brake operation. The air when heated can expand and cause the seal to become damaged or dislodged, thus rendering the seal ineffective. The air may also escape past the fluid pressure seal, thereby entering the hydraulic system with consequent loss of brake pedal. A careful brake bleeding operation is then required. After the heated and expanded air cools, it decreases in volume and may prevent the retraction of the piston, or even move the piston, and thus place the friction pad into full contact with the disc, causing a brake drag, with subsequent loss of horsepower and greater brake wear. The expansion and contraction of the air in the chamber has been minimized to some extent by providing a piston face member formed of an insulating material which decreases the amount of heat conducted to the piston. This not only decreases the temperature range of the air chamber, but also aids in preventing overheating of the pressurizing fluid acting on the piston. However, this solution is not entirely satisfactory insofar as the air chamber is concerned.

In accordance with the invention it is now proposed to provide a suitable vent arrangement for the air chamber so that it may breathe during its heating and cooling cycles and during any changes of volume occurring due to piston movement. In the preferred embodiment this is accomplished by providing channels in the face of the insulating block adjacent the piston so that when the block is secured to the piston vent passage means are formed connecting the seal chamber with the atmosphere through other suitable passage means also formed in the block. Such a construction permits the channels to be formed as the insulating block is molded, therefore requiring no additional drilling or machining of the piston. In some instances, however, it may be desirable to form at least part of the venting means in the piston. When the piston is made by a molding process, this can be easily accomplished in a similar manner without additional machining requirements.

In the drawing:
FIGURE 1 is a side view of a disc brake assembly embodying the invention.
FIGURE 2 is a cross section view taken in the direction of arrows 2—2 of FIGURE 1, with parts broken away and showing structure embodying the invention in detail.
FIGURE 3 is an elevation view of the front or outer side of the insulator block forming a part of the structure illustrated in FIGURE 2.
FIGURE 4 is a cross section view of the insulator block of FIGURE 3 taken in the direction of arrows 4—4 of that figure.
FIGURE 5 is a perspective view of the insulator block of FIGURE 3.

The brake assembly 10 of FIGURE 1 includes a steering knuckle 12 on which is mounted a brake actuator housing 14. A wheel 16 is rotatably mounted on a stub axle formed as a part of the steering knuckle 12 and carries the brake disc 18. The actuator housing 14 is illustrated as having two wheel cylinder assemblies on the side in view, one of which is illustrated in greater detail in FIGURE 2. Only one such assembly will be further described. The housing 14 is provided with a bore 20 in which a pressure actuated piston 22 is reciprocably mounted. Piston 22 has an outer peripheral land 24 in which the pressure seal 26 is secured. Piston 22, seal 26 and housing 14 cooperate to define pressure chamber 28. Pressurized brake fluid introduced into chamber 28 creates a force tending to move piston 22 to the left as seen in FIGURE 2 to actuate the brake. The piston is illustrated as being provided with a guide 30 and a spring 32 which lightly urges the piston to the left toward disc 18. In addition to piston 22, the piston assembly includes a piston face member 34 which is preferably an insulator block. The piston has an axially extending shoulder or flange 36 on the piston side toward disc 18 which acts as a force-transmitting member, the inner periphery of which provides a pilot for the pilot section 38 of the face member or block 34. A similar axially extending shoulder or flange 40 formed as a part of block 34 engages the friction member assembly 42 in force-transmitting relation. Assembly 42 includes a backing plate 44 in contact with the force-transmitting section of block 34 and has secured to it a friction pad 46 formed of a suitable friction material. In the particular wheel cylinder assembly illustrated, pad 46 lightly engages the braking surface of disc 18 at all times so that no piston adjustment is necessary. However, the invention may be incorporated in wheel cylinder assemblies utilizing piston retractors.

The outer periphery 48 of block 34 is provided with a sealed groove 50 which receives the inner periphery of a rolling diaphragm type dust seal 52. The outer periphery of seal 52 is secured to the open end of bore 20 of the housing 14. The reversely bent portion of seal 52 preferably extends away from the friction assembly 42 and is spaced from the piston land 24 so that an air chamber 54 is formed.

The block 34 has its outer side provided with a central recess 56 receiving the head of a fastener 58 utilized to secure the block to the piston 22. A passage 60 is formed axially through the center portion of block 34 and is of greater diameter than the diameter of fastener 58 so as to provide an annular passage about the fastener. The bottom of recess 56 is provided with one or more radially extending channels 62 which provide a passage from the recess underneath the head of the fastener 58 and communicating with passage 60. The inner surface of block 34 includes the pilot section 38 and may be slightly spaced from the piston end surface 64. This will assure force-transmitting contact of the block section 40 with the piston shoulder 36. Channels 66 are provided in the inner surface of block 34 and extend radially outward from the inner end of passage 60 so that they connect with chamber 54. Channels 66 become closed passages when the block 34 is secured against piston 22. Thus vent passage means are provided to vent chamber 54 to the atmosphere through channels 66, passage 60, and channels 62. It is normally not necessary to provide additional channels in block 34 to pass air adjacent backing plate 44, although this may be done in some instances.

When the brake assembly is actuated, friction pad 46 engages disc 18 in braking relation and the braking energy is dissipated as heat. If chamber 54 is tightly sealed, the air therein can become sufficiently heated to create a pressure on one side of seal 52 which will either blow the seal outwardly, thus loosening it, or cause other damage to the seal. If the seal 52 is not damaged in such release of pressure in chamber 54, the pressure buildup in chamber 54 by heat will remain for a time after the brake is released, and the pressure may be greater than the residual pressure in chamber 28, thus tending to urge air into the chamber 28 past seal 26. When a hydraulic braking system of the type illustrated is utilized, this could result in air being introduced into the hydraulic system with consequent well-known resulting problems. During the heating process the piston may be urged away from the disc with resultant less braking force. When the air in the chamber cools, the piston can be drawn toward the disc if some of the chamber air was earlier expunged, causing undesirable braking. By venting chamber 54 through block 34, the dangers inherent in the buildup of pressure and volume are obviated, and the vent is sufficiently protected to discourage the entry of dust and other foreign matter into bore 20.

What is claimed is:
1. A wheel cylinder piston assembly comprising a piston body having an outer peripheral land and a fluid pressure seal mounted on said land and a reduced radius axially extending pilot flange and an insulator block piloted on said flange, means securing said block to said piston body axially against said flange, a dust seal secured to said block on the outer periphery thereof in axially spaced relation to said land, and vent passage means in said block venting the space between said dust seal and said land to atmosphere.

2. A piston assembly comprising a piston having an insulator block secured to one end thereof and passage means in said assembly extending radially inward at the joint between said block and said piston and axially outward through a center portion of said block.

3. A piston assembly forming an actuator for a disc brake friction member and comprising a piston body having a pressure sealing land and an axially extending force-transmitting annular shoulder of lesser diameter than said land, a piston heat insulator having an annular force-transmitting section in axial alignment with said shoulder and a center pilot section piloted on the inner periphery of said shoulder and a center passage through said pilot section, means extending through said center passage in radially spaced relation thereto and securing said insulator to said piston, a piston dust seal secured to the outer periphery of said insulator in spaced relation to said pressure sealing land, and vent passage means formed in said insulator including at least one radially extending channel on the side of said insulator abutting said piston body and a passage axially through said insulator formed by said center passage and said securing means, said vent passage means maintaining atmospheric pressure on the side of the dust seal toward said pressure sealing land.

References Cited by the Examiner
UNITED STATES PATENTS

| | | | |
|---|---|---|---|
| 2,437,670 | 3/1948 | Adamson. | |
| 2,754,936 | 7/1956 | Butler | 188—152 |
| 2,776,864 | 1/1957 | Powlas | 92—86 X |

FOREIGN PATENTS

| | | | |
|---|---|---|---|
| 931,452 | 7/1963 | Great Britain. | |

MILTON BUCHLER, *Primary Examiner.*

G. E. A. HALVOSA, *Assistant Examiner.*